Oct. 5, 1965 K. A. DUKE ETAL 3,210,738
SIGNAL RE-CODING APPARATUS
Filed March 13, 1962
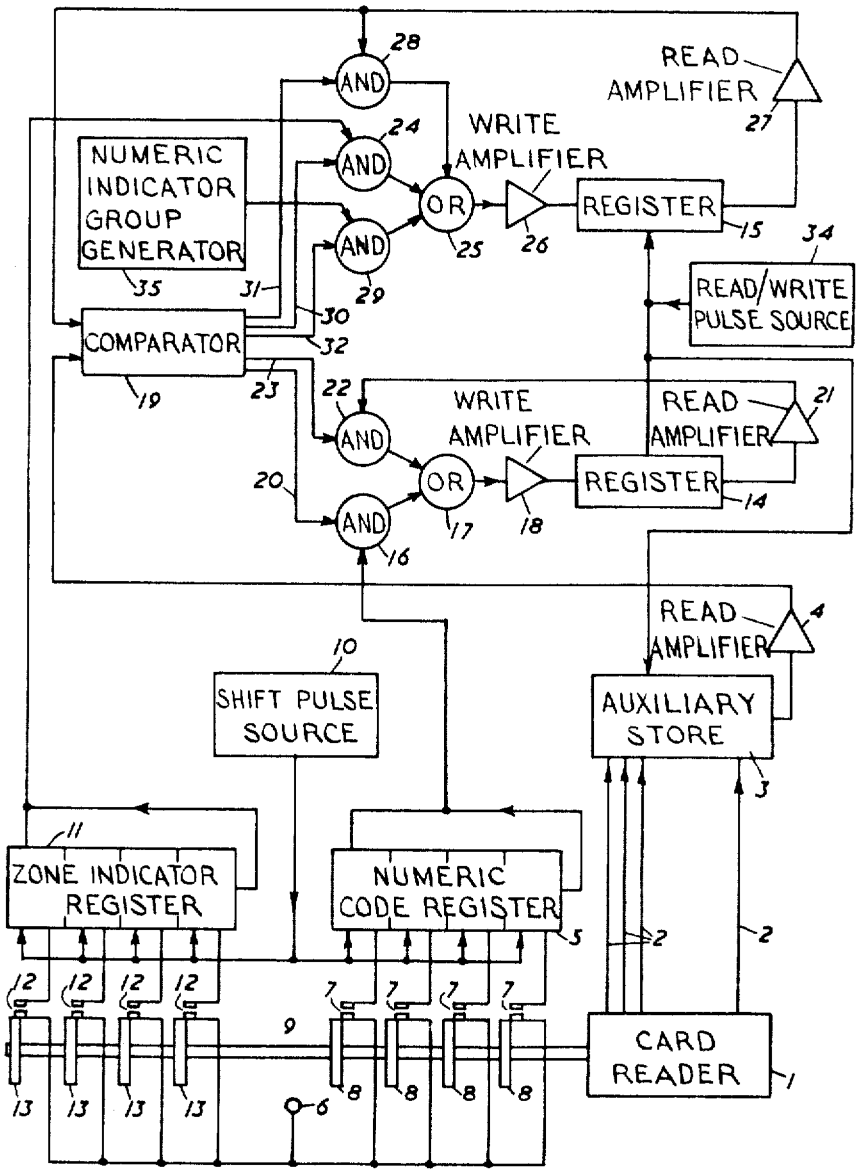
INVENTORS
KEITH ALBERT DUKE
PHILIP WOOD
BY Kane and Nydick
ATTORNEYS United States Patent Office 3,210,738

Patented Oct. 5, 1965

3,210,738

SIGNAL RE-CODING APPARATUS

Keith Albert Duke and Philip Wood, Chandler's Ford, Eastleigh, England, assignors to International Computers and Tabulators Limited Filed Mar. 13, 1962, Ser. No. 179,340
Claims priority, application Great Britain, Mar. 20, 1961, 10,037/61
6 Claims. (Cl. 340—172.5)

This invention relates to signal recoding apparatus, and in particular to apparatus for recoding, into coded signal groups, signals occurring at predetermined index points in a cycle of operation of the apparatus.

A conventional method of recording data on a record card by means of holes punched in the card is shown, for example, in United States Patent No. 2,016,682. The card is divided into columns and rows, and separate items of data are represented by holes punched in the separate columns, the first ten rows in order having, respectively, the significance 9, 8, 7, . . . 0 and there being two further rows having zone significance. An item of numerical data is recorded in a column by punching a single hole which is located in the row which represents the numerical value, whilst an item of alphabetic data, such as an alphabetic character or other symbol, is recorded by punching two holes in a column, one hole being punched in one of the zone rows and the other hole being punched in one of the first ten rows.

The columns of the card are sensed concurrently, the rows being sensed one at a time in turn at a series of index points of a sensing cycle. Considering a single column of the card, detection of a hole in that column causes an electrical signal to be fed out from a card reader and thus numerical data recorded in the column gives rise to a single signal occurring at an index point corresponding to the row in which the hole is located. Alphabetic data gives rise to two signals, one corresponding to each hole detected.

Thus, data read from single columns may be represented by either single signals or by pairs of signals, in dependence upon whether the columns contain alphabetic or numeric data. However, electronic computing apparatus usually requires that a consistent code be employed for the expression of all data and it is therefore necessary to recode all the signals into a consistent form in which all the characters, whether alphabetic or numeric, are expressed in a two-part code.

It is an object of the present invention to provide apparatus for recoding signals obtained from the sensing of a record card in which data are recorded by means of holes punched in the card or by other suitable markings.

According to one aspect of the invention, apparatus for recoding signals occurring at predetermined index points in a cycle of operation of the apparatus into two signal groups includes first and second stores, means to generate a code signal group and a first indicator signal group representing the significance of a first index point signal, to enter said code signal group into the first store, and to enter said first indicator signal group into the second store, means operative if a second signal occurs at a later index point in the same cycle to generate a second indicator signal group representing the significance of the second index point, and replacement means to replace said first indicator signal group in the second store by said second indicator signal group.

According to a further aspect of the invention, apparatus for recoding signals occurring at predetermined index points in a cycle of operation of the apparatus includes first and second stores, readout means operative index point by index point to read out in a cyccle of operation of the apparatus an item of information reorded by a first mark at a selected index point or by said first mark and a second mark at a further selected index point on a record carrier, means operative in dependence upon the sensing of the first mark by the read-out means to generate a code signal group and a first indicator signal group, to enter said code signal group into the first store and to enter said first indicator signal group into the second store, means operative in dependence upon the sensing of the second mark by the read-out means to generate a second indicator signal group which represents the significance of said second mark, and replacement means to replace said first indicator signal group in the second store by said second indicator signal group.

One embodiment of the present invention will now be described, by way of example, with reference to the accompanying drawing, which is a block diagram of apparatus for recoding data sensed from record cards for entry into electronic computing apparatus.

In this embodiment the last two rows of a card may have zone significance, as described above, or may alternatively be used to represent the numerals 11 and 12. The record cards having data recorded thereon are read by a card reader 1, which feeds the cards row by row, starting with the "9" row, between a contact roll and a number of sensing brushes (not shown), there being a separate brush for each column of the card. When a brush detects a hole in the card an electrical circuit is completed between the roll and the brush and an impulse is fed from the card reader 1 to one of a plurality of output lines 2 (of which only four lines are shown), there being a corresponding line for each of the brushes.

Each of the lines 2 is connected to a separate one of a plurality of bistable elements (not shown), which together form an auxiliary store 3. The elements, which can be set to either a binary "0" state or a binary "1" state, are initially set to the "0" state, any element being switchable to the "1" state by an impulse fed to it from the corresponding line 2. Thus, on reading a row of the card, each element of the auxiliary store 3 which corresponds with a column in which a hole is located is set to the "1" state. The auxiliary store 3 may consist of a shifting register in which each stage is set by an input on a line 2, or it may consist of a row of magnetic cores arranged to be set by the parallel inputs on the lines 2 and to be read out serially by way of a read amplifier 4.

The stage of a numeric code register 5, which comprises a four stage recirculating register, are set by means of impulses fed thereto by way of pairs of contacts 7 connected to an input terminal 6. The contacts 7 are operated by means of cams 8 attached to a shaft 9 which is rotated synchronously with the row-by-row feeding of the card in the card reader 1. The cams 8 are so arranged that a numeric code signal group is set up in the register 5, the group representing, in binary coded decimal form, the numerical value of the row being read, the states of the four stages thus representing, respectively, the bits 1, 2, 4 and 8. Shift pulses are applied to the stages of the register 5 from a shift pulse source 10 to cause the numeric code signal group to circulate through the register 5 and to appear repeatedly at the output of the register 5.

A zone indicator register 11, similar to the register 5, is also provided. A zone indicator signal group is set into the register 11, in synchronism with the timing of the reading of the zone rows by the card reader 1, by means of pairs of contacts 12 which are operated by cams 13, also attached to the shaft 9. In the present embodiment only three zone indicator signal groups are required to represent, in combination with the numeric code signal groups, all of the desired alphabetic characters. Therefore only three of the stages of the register 11 are required to be set by the contacts 12. However, if it is desired to represent additional characters, all four of the stages of the register 11 may be connected to cam-operated contacts to provide a sufficient number of zone indicator signal groups. Shift pulses are applied to the stages of the register 11 from the source 10 to cause the zone indicator signal group to circulate through the register 11 and to appear repeatedly at the output of the register 11.

The apparatus is provided with a main store, of which only the two registers 14 and 15 are shown. Each of the registers 14 and 15 consists of a number of bistable elements, and may comprise a row of cores in a magnetic core matrix or may be a shifting register. Each of the registors 14 and 15 has a separate storage location corresponding to each of the elements, respectively, of the auxiliary store 3 and each location of the registers 14 and 15 has separate elements for storing the 1, 2, 4 and 8 bits of the binary coded decimal representation of the data to be stored, the elements being set under control of write pulses from a read-write pulse source 34.

The numeric code group signals, set up in the register 5, can be fed to the register 14 by way of an AND-gate 16, an OR-gate 17 and a write amplifier 18, the gate 16 being opened by signals from a comparator 19 fed to the gate 16 along a line 20. Data set up in the register 14 can be recirculated from the output of the register 14 by way of a read amplifier 21, an AND-gate 22, the gates 17 and the amplifier 18, the gate 22 being opened by signals from the comparator 19 fed to the gate 22 along a line 23, only one of the gates 16 and 22 being open at a time.

The zone indicator signal group, set up in the register 11, can be fed to the register 15 by way of an AND-gate 24, an OR-gate 25 and a writer amplifier 26. Data set up in the register 15 can be recirculated from the output of the register 15 by way of a read amplifier 27, an AND-gate 28, the gate 25 and the amplifier 26.

A numeric indicator group generator 35 is arranged to generate a numeric indicator signal group at each index point. The signals of this group can be fed to the register 15 by way of an AND-gate 29, the gate 25 and the amplifier 26. The gates 24, 28 and 29 are arranged to be opened one at a time by signals fed thereto from the comparator 19 along the lines 30, 31 and 32 respectively.

Output signals from the auxiliary store 3 and the register 15 are fed to the comparator 19 through the read amplifier 4 and the amplifier 27, respectively.

In operation of the apparatus, the store 3 and the registers 14 and 15 are initially in a cleared state. The first row of a card, i.e. the "9" row, is read by the card reader 1 and the stages of the auxiliary store 3 are set to correspond with the holes detected in this row. At the same time, the positions of the cams 8 are such as to cause the register 5 to be set to represent the numeral 9 in binary coded decimal form.

Pulses from the read-write pulse source 34 are applied to the auxiliary store 3 to cause the reading-out of items of data from one element at a time, through read amplifier 4, to the comparator 19, thus informing the comparator 19 whether a hole has been punched in the particular row and column. At the same time as an item of data is read out of the auxiliary store 3, the numeric code signal group in the register 5 is recirculated and also fed to the gate 16. If the signal from the store 3 indicates the punching of a hole, the comparator 19 provides a signal which opens the gate 16 and the numeric code signal group from the register 5 is fed through the gate 17 and the amplifier 18 to one storage location of the register 14, thus setting the location to represent the significance of the row.

At the same time an output is provided by the comparator 19 on the line 32 to open the gate 29, thus letting through a signal group from the generator 35. This group represents, in binary coded decimal form, a numeric indicator code digit, for example 0010, which is fed through the gate 25 and the amplifier 26 to the register 15, where it is stored in the corresponding location to indicate that the digit stored in the register 14 is numeric.

If no hole has been sensed by the card reader 1, no signal is passed by the store 3 to the comparator 9 and no signal is, therefore, fed to either register 14 or register 15.

The above procedure is repeated for all of the elements of the auxiliary store 3, separate locations of registers 14 and 15 being set, or not set, in dependence upon the presence or absence, respectively, of a punched hole in each column of the card.

The elements of the auxiliary store 3 are then reset to the "0" state and the next row of the card is read by the card reader 1, the setting up of auxiliary store 3 again being performed. The data in the registers 14 and 15 are read out by means of pulses from the read-write pulse source 34, one location at a time, to gates 22 and 28 respectively, the data from the register 15 being also fed to the comparator 19. If no hole is sensed corresponding to a particular location, the comparator 19 feeds signals along lines 23 and 31 to open the gates 22 and 28, respectively, and the data are recirculated through the gate 17 and the amplifier 18 to the register 14, and through the gate 25 and the amplifier 26 to the register 15, respectively. The data are thus preserved in the register 14 and 15.

On the other hand, if a hole in the card is sensed, a signal is fed to the comparator 19 by the auxiliary store 3. If this is the second hole in a column, the corresponding storage location of the register 15 has already been set by the numeric indicator signals, and these signals are read out and fed to the comparator 19 as previously explained.

On receipt of the signals from the store 3 and the register 15, the comparator 19 feeds a signal along the line 30 to open the gate 24. Since two holes have been sensed in the column, the holes must signify an alphabetic character or other symbol, and an alphabetic zone indicator signal group will, therefore, be set up in the register 11. Since the gate 24 is open, this group, which is caused to recirculate by shift pulses from the source 10, will pass through the gate 24, the gate 25 and the amplifier 26 to the register 15 where the zone indicator signal group replaces the numeric indicator signal group which was previously in the corresponding location.

The comparator 19 also opens the gate 22 and the data previously set up in the register 14 are read out and recirculated back to the register 14. Thus the registers 14 and 15 are now storing, respectively, a numeric code signal group and a zone indicator signal group in binary coded decimal form.

The further reading of rows of the card does not produce a further signal from an element of the auxiliary store 3 corresponding with a column of the card in which two holes have already been sensed, and so the data stored in the corresponding locations of the register 14 and 15 are recirculated during the reading of succeeding rows.

Although in the embodiment described above the registers 5, 11, 14 and 15 are arranged to operate with signals in binary coded decimal form, it is to be understood that any suitable form of coding, for example bi-quinary, could be used in carrying out the invention.

Furthermore, although the input data are read from a punched record card in the above embodiment, they could alternatively be read from a punched tape, a magnetic tape or any other suitable record carrier.

We claim:

1. Signal recoding apparatus responsive to information representing signals occurring at timed intervals in a cycle of operation to register the information represented thereby in a two-part code having a value representing part and an indicating part, including first and second code component generators respectively operating in synchronism with the operating cycle and each generating different code component combinations respectively for each of the different time intervals during the operating cycle; first and second storage locations respectively associated with said value representing part and said indicating part; a further indicator code component generator operable to generate the same indicating code representation throughout the entire cycle; and storage control means responsive to a signal occurring at a first time interval to transfer the code components generated by said first code component generator into said first storage location and to transfer said indicating code representation from said further indicator code component generator into said second storage location, and to a signal occurring at a subsequent time interval in the same cycle of operation to transfer the code components generated by said second code component generator to said second storage location to replace said indicating code representation.

2. Signal recoding apparatus responsive to information representing signals occurring at timed intervals in a cycle of operation to register the information represented thereby in a two-part code having a value representing part and an indicating part, including first and second code component generators respectively operating in synchronism with the operating cycle and each generating different code component combinations respectively for each of the different time intervals during the operating cycle; first and second storage locations respectively associated with said value representing part and said indicating part; a further indicator code component generator operable to generate the same indicating code representation throughout the entire cycle; and storage control means including means for recognising the occurrence of an information signal subsequent to the first occurrence in each operating cycle, said storage control means being effective in response to the occurrence of the first information signal in the cycle to transfer the code components generated by said first code component generator into said first storage location and to transfer said indicating code representation from said further indicator code component generator into said second storage location and being effective under joint control of the recognising means and of the subsequent information signal in the same cycle to transfer the code components generated by said second code component generator unchanged into said second storage location.

3. Signal recoding apparatus responsive to information item representing signals occurring at timed intervals in a cycle of operation to store the information items represented thereby in a two-part code having indicating and value representing parts respectively, including first and second code component generators respectively operating in synchronism with the operating cycle and each generating different code component combinations respectively for each of the different time intervals during the cycle; means for separately registering signals representative of different information items occurring concurrently; first and second groups of corresponding storage locations, the groups being associated respectively with said value representing and said indicating parts of the two-part code and the different locations of each group being allocated respectively for storing code components of different information items; a further indicator code component generator operable to generate the same indicating code representation throughout the entire cycle; identifying means operable in response to the first-occurring signal for each separate information item in a cycle; and control means jointly responsive to the registering means and the identifying means at each time interval in the cycle to transfer the code components generated by said first code component generator into those storage locations of the first group allocated to information items for which a first-occurring signal is registered at the current time interval and to transfer said indicating code representation from said further indicating code generator into the corresponding storage locations of the second group, said control means further being responsive to said registering means and to said indicating means to transfer the code components generated by said second code component generator unchanged into those storage locations of the second group allocated to information items for which a signal other than the first is registered at the current time interval.

4. Signal recoding apparatus responsive to information item representing signals occurring at timed intervals in a cycle of operation to store the information items represented thereby in a two-part code having indicating and value representing parts respectively, including first and second code component generators respectively operating in synchronism with the operating cycle and each generating different code component combinations respectively for each of the different time intervals during the cycle; means for separately registering signals representative of different information items occurring concurrently; first and second groups of corresponding storage locations, the groups being respectively associated with said value representing and said indicating parts of the two-part code and the different locations of each group being allocated respectively for storing code components of different information items; a further indicator code component generator operable to generate the same indicating code representation throughout the entire cycle; means for identifying the first-occurring signal in a cycle for each separate information item; means for scanning all the storage locations of each group in turn at each time interval, the corresponding locations of both groups being scanned concurrently; and control means synchronized to said scanning means and connected to said registering means and to said identifying means, the control means being effective in response to the registration of a first occurring signal of an information item to transfer said indicating code representation into a storage location of the second group and to transfer the code components generated by said first component generator into the corresponding storage location of the first group at the scanning time of those storage locations of the groups allocated to the storage of the information item for which said first-occurring signal is registered, and said control means further being effective in response to the registration of a subsequently-occurring signal of the same information items to transfer the code components generated by said second code component generator unchanged into the storage location of second group allocated to that information item at the time when the storage location is scanned at a later time interval of the cycle.

5. Signal recoding apparatus responsive to information item representing signals occuring at timed intervals in a cycle of operations to store the information items represented thereby in a two-part code having indicating and value-representing parts respectively, including means for separately registering concurrently occurring signals respectively representative of different information items; first and second groups of corresponding storage locations, the groups respectively being associated with said value-representing and said indicating parts of the two-part code and the different locations of each of the groups respectively being allocated for storing code component combinations of different information items; a first recirculation path for said first group of storage locations including a a first transfer channel; a second recirculation path for said second group of storage locations including a second transfer channel; first and second code component generators respectively connected to said first and second transfer channels, said code component generators operating in synchronism with the operating cycle and each generating different code component combinations for each of the different time intervals of the cycle; a further code component generator connected to said second transfer channel operable to generate the same indicating code component combination throughout the entire cycle; control means effective to control the complete recirculation of the contents of the first and second groups of storage locations over the respective recirculation paths in synchronism with a single complete scan of the signal registering means during each time interval in the operating cycle; and code component detecting means coupled to said registering means and to said second recirculating path effective in response to registration of a signal in the absence of code components circulated from that storage location of the second group allocated for storing the information item represented by the registered signal to control said first and second transfer channels respectively to enter code component combinations from said first code component generator and said further code component generator respectively into the first and second recirculation paths, said code component detecting means further being effective in response to registration of a signal in conjunction with the presence of code components circulated from that storage location of the second group allocated for storing the information item represented by the registered signal to control only said second transfer channel to enter code combinations unchanged from said second code component generator into the second recirculation path.

6. Signal recoding apparatus responsive to information item representing signals occurring at timed intervals in a cycle of operation to store the information items represented thereby in a two-part code having indicating and value-representing parts respectively, including first and second storage locations respectively associated with said value representing and said indicating parts of the two-part code; first and second entry paths respectively associated with said first and second storage locations; first and second gates connected to said first entry path each to control the entry of code component combinations to said first storage location; a recirculating path connected from said first storage location to said first gate; a first code component combination generator connected to said second gate effective to generate a different combination of code components for each timed interval during a cycle of operation; third, fourth and fifth gates each to control the entry of code component combinations to said second storage location; a recirculating path connected from said second storage location to said third gate; a second code component combination generator connected to said fourth gate effective to generate a different combination of code components for each timed interval during a cycle of operation; a further indicating code generator connected to said fifth gate effective to generate the same combination of code components throughout an entire cycle of operation; a code component combination detector connected to one of said recirculation paths; means for registering a signal occurring at any timed interval during the cycle; means for applying a registered signal to said code component combination detector; and means for reading out code component combinations from said first and second storage locations respectively to said recirculation paths at each time interval during the cycle, the code component combination detector being effective to control the gates to permit entry of code component combinations to the storage locations at each timed interval jointly in response to the registration of a signal and to the recirculated code component combinations such that in the absence of a registered signal said first and third gates are opened to permit code components from the recirculation paths to enter the storage locations; for the registration of a signal in the absence of code components on the recirculation path said second and fifth gates are opened to permit the passage of code components and for the registration of a signal concurrently with the presence of code components on the recirculation path said first and fourth gates are opened to modify only the code components entering the second storage location.

References Cited by the Examiner

UNITED STATES PATENTS

| | | | |
|---|---|---|---|
| 2,774,429 | 12/56 | Rabenda | 340—174 |
| 3,015,441 | 1/62 | Rent et al. | 235—157 |

ROBERT C. BAILEY, *Primary Examiner.*

MALCOLM A. MORRISON, *Examiner.*